United States Patent [19]

Wallace et al.

[11] Patent Number: 4,676,936

[45] Date of Patent: Jun. 30, 1987

[54] CONTROLLED COEXTRUSION OF BARRIER SHEET

[75] Inventors: Theodore C. Wallace, Midland, Mich.; Janet M. Streif, Farley, Iowa

[73] Assignee: The Dow Chemical Company, Midland, Mich.

[21] Appl. No.: 812,489

[22] Filed: Dec. 23, 1985

[51] Int. Cl.$^4$ .............................................. B29C 47/92
[52] U.S. Cl. ................................ 264/40.1; 156/244.11; 264/40.2; 264/78; 425/135; 425/141; 425/169
[58] Field of Search ......................... 264/40.1, 40.2, 78; 156/244.11; 425/141, 135, 169

[56] References Cited

U.S. PATENT DOCUMENTS

| 2,584,583 | 2/1952 | Hillery | 88/14 |
| 2,655,073 | 10/1953 | Strickler et al. | 88/14 |
| 2,773,412 | 12/1956 | Huck | 88/14 |
| 2,845,838 | 8/1958 | Lindberg et al. | 88/14 |
| 3,017,512 | 1/1962 | Wolbert | 250/83.3 |
| 3,395,278 | 7/1968 | McDivitt | 250/83.3 |
| 3,645,623 | 2/1972 | Patten | 356/1 |
| 3,715,420 | 2/1973 | Kiyono et al. | 264/245 X |
| 3,732,016 | 5/1973 | Deshayes et al. | 356/161 |
| 3,793,135 | 2/1974 | Monia | 161/165 |
| 3,874,794 | 4/1975 | Schmitt et al. | 356/36 |
| 3,892,490 | 7/1975 | Uetsuki et al. | 356/161 |
| 3,992,499 | 11/1976 | Lee | 264/78 |
| 3,997,268 | 12/1976 | Fladda et al. | 356/161 |
| 4,057,667 | 11/1977 | Wiggins et al. | 428/35 |
| 4,107,245 | 8/1978 | Jansson | 264/78 |
| 4,194,039 | 3/1980 | Mueller | 156/244.11 |
| 4,207,467 | 6/1980 | Doyle | 250/338 |
| 4,285,745 | 8/1981 | Farabaugh | 156/64 |
| 4,355,903 | 10/1982 | Sandercock | 356/382 |
| 4,440,089 | 4/1984 | Cicin-Sain et al. | 104/12 |

FOREIGN PATENT DOCUMENTS

| 0023662 | 2/1979 | Japan | 264/40.2 |
| 0110907 | 7/1982 | Japan | 264/40.2 |
| 0081126 | 5/1983 | Japan | 264/40.2 |
| 0134713 | 8/1983 | Japan | 264/40.2 |
| 2038038 | 7/1980 | United Kingdom | 264/40.2 |

Primary Examiner—Jan H. Silbaugh
Assistant Examiner—Harold Pyon
Attorney, Agent, or Firm—L. E. Hessenaur, Jr.

[57] ABSTRACT

The thickness of the barrier layer in coextruded multilayer, thermoformable resinous sheet material is controlled by transverse color monitoring during coextrusion of the sheet.

8 Claims, 2 Drawing Figures

CONTROLLED COEXTRUSION OF BARRIER SHEET

BACKGROUND OF THE INVENTION

This invention relates to optical control of the coextruded thickness of one or more layers of a multilaminate resinous sheet by relative color difference.

In the past, many different techniques have been employed to measure the thickness of a number of different types of films on a number of different substrates. For example, surface profile monitors have been used to track a stylus over the surface of various substrate materials. However, physical contact can distort or damage the surface; accordingly, methods based on light reflection from the film surface have been employed to offer a non-contact measurement. However, coextruded resinous materials heretofore have not been so measured.

More particularly, various optical methods have been used to measure the thickness of for example, dielectric layers, protective inorganic films, and antireflective coatings on glass as in U.S. Pat. Nos. 2,584,583; 2,845,838; 3,395,278; 3,544,222; 3,773,40; and 3,892,490. Other optical techniques have been adapted to gauge the thickness of organic layers applied to metal substrates as for example U.S. Pat. Nos. 3,017,512 and 4,207,467. Still others monitor the thickness of films and coatings in the paper, printing and pharmaceutical industries as in U.S. Pat. Nos. 2,773,412 and 3,874,794. Some processes are generally applicable to measuring or monitoring the optical thickness of thin films without regard to the type of substrate as in U.S. Pat. Nos. 3,645,623; 4,320,967 and 4,355,903. A few techniques have measured the thickness of transparent plastic films such as U.S. Pat. Nos. 2,655,073; 3,732,016; 3,997,268; 4,285,745; and 4,440,089.

Although specialized monitors employing X-rays or ultraviolet light, or infrared have been developed, there are essentially two distinct techniques for optical determination of film thickness. The first, known as ellipsometry, measures and compares the reflection coefficient measured at a given wavelength and an angle of incidence for polarization perpendicular and parallel to the plane of incidence. Considerable computation is required and unambiguous results are obtained only if it is known a priori that the film thickness lies within a restricted range, usually 0 to 3000 Angtroms. The second class of optical techniques is based on the wavelength and/or angle of incidence dependence of the reflectivity, observable as the well-known interference colors in thin films. Although the principle of this technique is simple, instruments based on this principle are not cheap, even when they do not give a direct reading of the film thickness. These previously known techniques have the further disadvantage in measuring the thickness of transparent and semitransparent resinous films in that they have not been adapted to aid coextrusion processes.

Accordingly, a non-contact, simple, essentially optical technique, devoid of the prior art problems, which can measure the thickness of one or more layers of a coextruded multilaminate resinous material would be a substantial advancement in the art.

SUMMARY OF THE INVENTION

It is a primary object of the present invention to eliminate the drawbacks and difficulties of light reflectance systems.

Another object of the present invention is to detect the thickness of a coextruded surface layer with improved accuracy.

Still another object is to carry out coextrusion of resinous materials in a simple, convenient and commercially practical, yet more effective manner.

These and other objects according to the present invention are achieved by an optical reflectance method for measuring the thickness of a barrier layer or layers of coextruded semi-transparent plastic film, which method includes coextruding said layer or layers into a sheet with other layers, exposing the layer or layers to the transverse scanning action of a light reflection measuring and recording device calibrated to monitor the simple index of film color and signal an alarm for out-of-tolerance barrier layers. The device will provide a constant recording, linearly proportional to the thickness of the semi-transparent layer.

DESCRIPTION OF THE PREFERRED EMBODIMENTS

Figure 1:
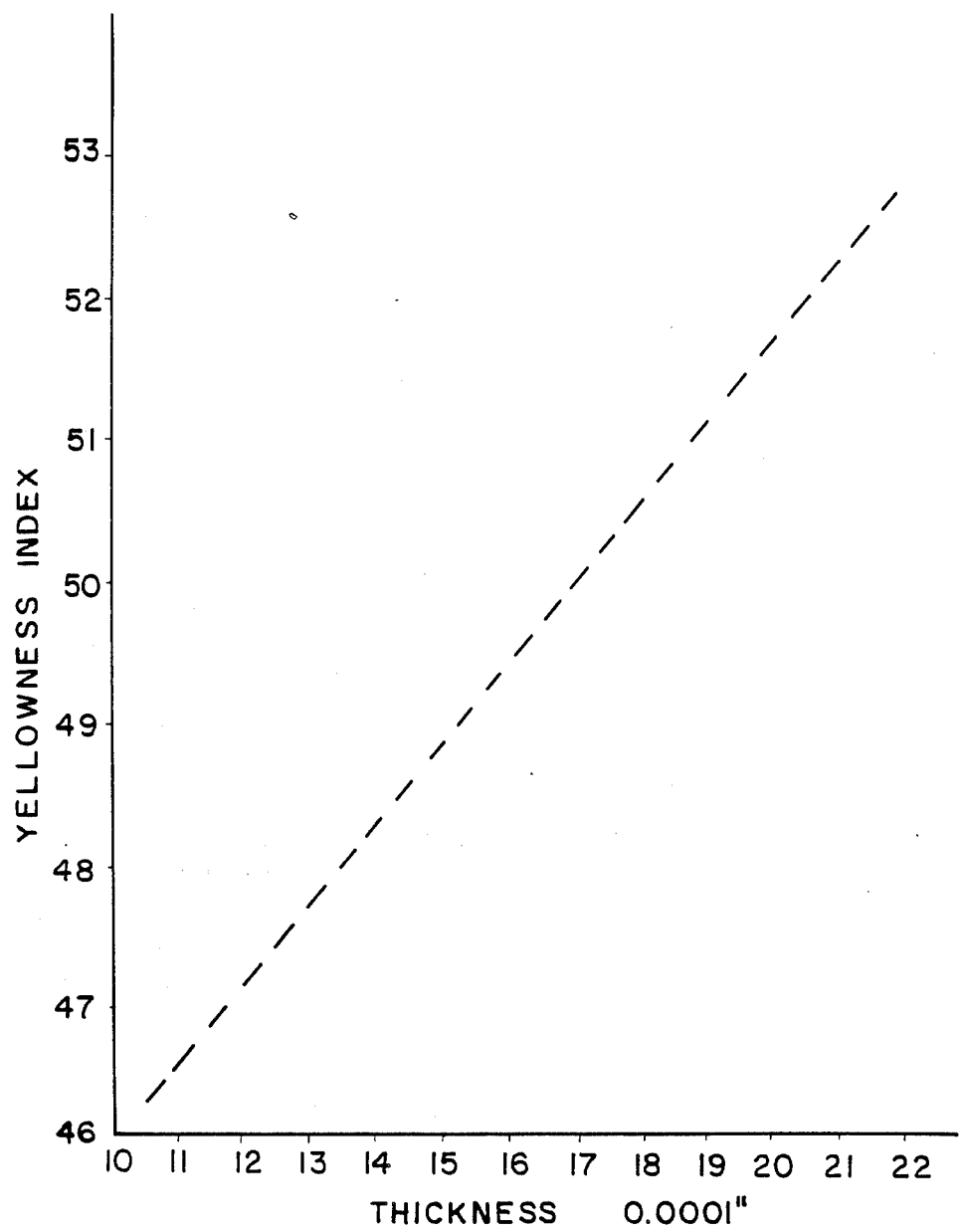

In accordance with this invention, multilayer coextruded thermoformable or plastic barrier sheet materials are provided. It is desirable for many packaging needs, particularly when packaging foodstuffs to have one or more layers of a high barrier material coextruded to one or more layers of less expensive, easily thermoformed material with good structural characteristics. Particularly preferred as the barrier layer material is that of a semi-transparent SARAN resin or SARAN blend, the SARAN copolymer containing for example polymerized therein vinylidene chloride in an amount of from about 40 to about 98% by weight of copolymer and at least one monoethylenically unsaturated monomer copolymerizable therewith in an amount of from about 60% to about 2% by weight of the copolymer. It may also be desirable to add a compatibilizer such as EEA, EMA, etc. This barrier material may serve as the layer which rests adjacent to the foodstuff itself when packaging spoilable food items, or other items sensitive to $O_2$, $H_2O$ vapor, etc.

Other plastics besides polyvinylidene chloride copolymer resin and SARAN blend resins, may also be utilized as the barrier layer. For example, a copolymer of ethylene and vinyl alcohol may be used as a barrier layer. Additionally, blends of ethylene and vinyl alcohol copolymer (EVOH) with a polyolefin and a compatibilizing agent also may serve as the barrier layer and other barrier materials (or blends of barrier materials where the barrier material constitutes greater than 50% of the blend by volume) may be used as long as it has an oxygen permeability of 5 or less as measured in cc per mil per 100 square inches per day per atmosphere at 23° C. Generally, SARAN resins have an oxygen permeability of 0.05-0.15; EVOH a rate of around 0.2; nitrile barrier resins, a rate of around 0.8; Nylons, a rate of around 2-3; and polyesters a permeability of around 3-4.

For cost effectiveness and quality control purposes, the thickness and/or quantity of the barrier material, especially SARAN blend resins are monitored in the process of this invention.

The materials are coextruded as sheet rather than film in any conventional manner with, for example, the SARAN blend layer ranging preferably from about 0.002" to about 0.025", at a temperature below the degradation temperature of the SARAN and a total laminate thickness of preferably between about 0.010" and 0.150".

By the term coextrusion process there is meant a process wherein the multiple layered composite comprises the layer of semi-transparent barrier material, preferably SARAN or SARAN blend but not limited to SARAN or SARAN blend, and one or more layers of optically non-transparent materials such as regrind/virgin material which can be any of the olefins, styrenics, polyesters, etc., such as polypropylene or blends of the above with compatibilizers, or blends of virgin and regrind material which are all extruded through a single extrusion die orifice. Details of layer composition are given in copending patent application Ser. No. 785,306; filed Oct. 7, 1985. Many types of coextrusion processes are known in the prior art, for example, those employing multi-manifold coextrusion dies, multi-cavity or die-within-a-die configurations; however, the most suitable type of coextrusion technique for producing the laminates described in this invention is the procedure described in U.S. Pat. No. 3,557,265. This patent describes a process exhibiting uniform layer thickness, good surface characteristics and firm adhesion between layers.

In particular, the process involves joining a heat plastified stream of SARAN and a heat plastified stream of virgin and regrind, as above described, in a generally circular or rectangular conduit upstream of a conventional manifold sheeting extrusion die to form a composite, stratified stream of two or more resinous materials having a relatively sharply defined juncture plane between the individual components of strata of the stream. This combined stream is then conveyed through the conduit to the sheeting die while controlling the melt viscosities of the individual thermoplastic resinous components to bring the two values as close together as possible, and then the combined stream is passed through the extrusion die in such a manner that the die lips are generally aligned or parallel with the plane of the interference or interferences between the strata of the combined stream.

Nevertheless, layer thicknesses may still vary by several mils unless controlled in accordance with this invention, or by the more costly and time consuming method of slitting the sheet.

As coextruded sheet is produced, the sheet is scanned in a transverse direction and a number of readings, preferably 3-7 are taken with a spectrophotometric sensor to record preferably the yellowness index of the sheet. This has been found to be linearly proportional to both the thickness and the amount of the barrier material, especially SARAN blend. A control means may, in turn, either increase or decrease, whichever is desired, the level of extrusion of the SARAN blend strata extruded through the orifice, and control thickness in both the direction of the machine and transverse thereto.

The spectral photometric analysis may be accomplished with a number of different instrumentation, including for example tristimulus colorimeter, spectrocolorimeter, reflectometer and spectrophotometer. MacBeth Color-Eye 1500 series color monitors and Hunter Associates Laboratory, Model 4201 continuous color monitors are especially preferred. However, other apparatus which may use diffuse reflected light to monitor the yellowness index can also be employed.

The calibration of the instrumentation to reflect the direct relationship between yellowness and barrier layer thickness is quite simple and may be based on for example CIE (Commision Internationale de l'Eclairage) X, Y, Z tristimulus values; or, CIE chromaticity coordinates, Y, x, y, or, Hunter L, a, b opponent colors scale; or CIE lab scale. It is particularly preferred, however, that CIE X, Y, Z be used.

On line color values, preferably yellow, are measured against a standard value correlated from the desired barrier, especially SARAN, thickness (entered into the color-monitor by key board) and automatically compared with the permissible tolerances. Any out-of-tolerance differences are signalled on a CRT display and signalled to an alarm system if desired.

It should be noted that although the native color of SARAN resin translates into yellowness factors, other barrier material or the SARAN or its blend may be dyed with any other color in which the layer will remain semitransparent and the index of the color thereof can be monitored. For example, blue/green affords an even more sensitive measure of thickness. By adding slight amounts of blue to SARAN blend, one can accentuate differences in blue/green and for some applications improve the general aesthetics.

It is also of note that the process of this invention can be applied to laminated structures where the barrier layer or SARAN is an inter layer of the composite structure rather than a surface layer. However, the layer or layers covering the SARAN are in that case preferably optically transparent ones such as polyethylene terephthalate (PET), polyethylene terephthalate glycol (PETG), polymethyl methacrylate (PMMA), alpha methyl styrene, thin layers of polypropylene, etc.

The barrier layer is preferably correlated to the color index by computing CIE X, Y, Z tristimulus values. The correlation coefficient is greater than 90% and ranges from 90% to 100%.

The following specific example is provided to facilitate a better understanding of the invention, it being understood that the same is intended to be merely illustrative and not in any sense limiting.

EXAMPLE 1

A two-layer coextrusion was undertaken at a total of 250 lbs/hr to produce a 0.130 inch thick multilayer structure 26⅜" wide. The first layer comprised 15% by volume of the total coextrudate and consisted of (by weight) a blend of 72% vinylidene chloride copolymer (SARAN* XU-32009.00 from Dow Chemical); 20% high density polyethylene (HDPE 4052N from Dow Chemical); and 8% ethylene ethyl acrylate (EEA 6182 from Union Carbide).
* Trademark of The Dow Chemical Company The second layer was a 50—50 weight combination of a polymer blend and a simulated regrind (scrap) material and constituted 85% by volume of the coextrudates. The simulated regrind consisted of (by weight), 45% high density polyethylene; 23% general purpose polystyrene (SP-71008.00 from Dow Chemical); 4% styrene-butadiene diblock (HX 649-A from Firestone); 24% vinylidene chloride copolymer (SARAN XU-32009.00); and 4% ethylene ethyl acrylate (EEA 6182).

The polymer blend consisted of (by weight), 54% high density polyethylene; 35% general purpose polystyrene; and 11% styrene-butadiene diblock (HX 649-A).

These materials were blended in a 50/50 ratio to produce the final second layer composition as follows: 49.5% high density polyethylene; 29% general purpose polystyrene; 7.5% styrene-butadiene diblock (HX 649-A); 12% vinylidene chloride copolymer (SARAN B-2000); and 2% ethylene ethyl acrylate (EEA 6182); 3 parts per hundred white color concentrate.

The two coextrudates were coextruded through a Dow feedblock. The first layer was extruded on a 2½", 21:1 L/D Sterling extruder at a polymer temperature of 360° F. The second layer was extruded on a 2½", 30:1 L/D Sterling extruder at a polymer temperature of 400° F. Coextrusion continued for 5 consecutive hours with no evidence of SARAN degradation in either layer.

Shortly after start up, and before steady state uniform layer thickness was achieved, a sample was saved for evaluation of yellowness index vs. SARAN blend layer thickness.

Data in the yellowness index experiment was generated the way it would be in a commercial operation. Measurements were made using a Hunter Associates Laboratory, Inc., continuous color monitor, Model 4201, with the sensor mounted on a traversing rail. The sensor had a viewing area of 2"×2¼". The sheet was scanned in the transverse direction; the first reading was taken at a point approximately 3 inches from one edge with successive readings taken at 6 inch intervals, bringing the last reading to a point about 3 inches from the other edge.

The sheet was scanned in this manner in 3 different machine direction locations, for a total of 15 data points.

Table 1 tabulates the data for yellowness index (D-1925) vs. SARAN blend layer thickness (measured by optical microscopy at the midpoint of the viewing area).

TABLE 1

|         | Points | Yellowness Index | in inches Thickness × 10⁻³ |
|---------|--------|------------------|-----------------------------|
| Scan #1 | 1      | 47.00            | 10.98                       |
|         | 2      | 50.39            | 19.40                       |
|         | 3      | 52.50            | 21.28                       |
|         | 4      | 46.86            | 13.32                       |
|         | 5      | 46.43            | 12.15                       |
| Scan #2 | 6      | 48.67            | 11.11                       |
|         | 7      | 51.52            | 19.51                       |
|         | 8      | 53.03            | 22.17                       |
|         | 9      | 47.63            | 13.40                       |
|         | 10     | 48.17            | 11.09                       |
| Scan #3 | 11     | 49.14            | 11.28                       |
|         | 12     | 52.25            | 18.48                       |
|         | 13     | 53.72            | 17.43                       |
|         | 14     | 49.28            | 13.25                       |
|         | 15     | 49.63            | 10.28                       |

To show the trend, FIG. 1 is a plot of yellowness index vs. thickness Scan #1, points 1-5.

The numerical data confirms the visual observation, indicating the darkest section near the center of the sheet with very nearly equal lightness areas at the edges.

Correlation coefficients by linear regression analysis, are as follows:
Scan #1, Points 1-5, correlation coefficient 97%
Scan #2, Points 6-10, correlation coefficient 94%
Scan #3, Points 11-15, correlation coefficient 88%

By reducing the viewing area, the correlation coefficient can be improved.

EXAMPLE 2

Figure 2:
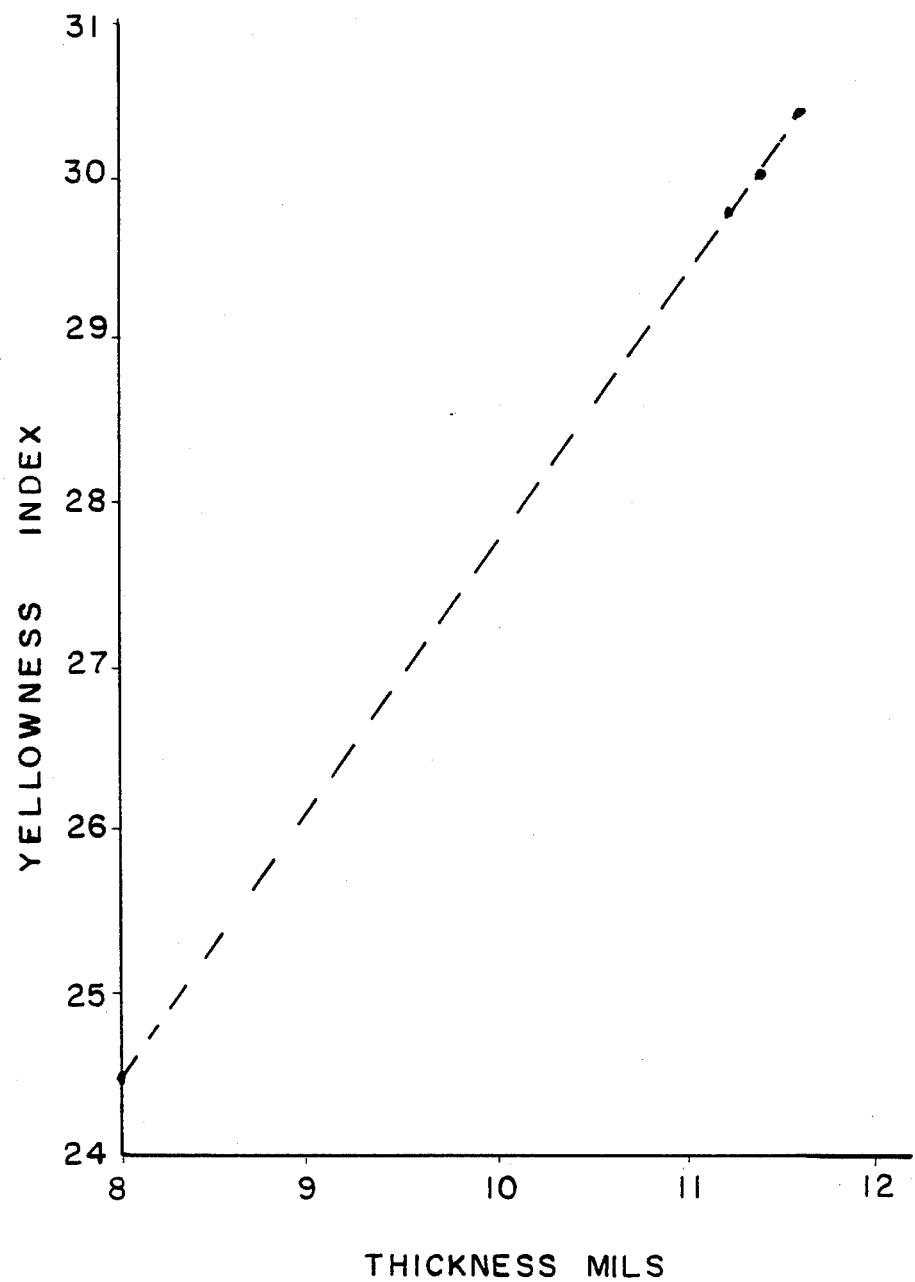

The procedure of Example 1 was followed except that a layer of clear polyester, specifically polyethylene terephthalate glycol modified (PETG) resin was coextruded as a third layer over the top of the first layer. The thickness of the PETG resin layer was maintained at 0.003" while the total thickness of the sheet was kept constant at 0.045", but the first layer (predominantly SARAN resin) thickness was allowed to gradually increase. This, of course, meant that the white pigmented layer described in thickness. The yellowness was monitored by a MacBeth Color Eye 1500 Series, and as can be readily seen from the enclosed FIG. 2, once again, a linear correlation is observed.

What is claimed is:

1. In a method for coextruding a multilaminate resinous barrier material, the improvement comprising;
    (a) continually joining a semi-transparent heat plastified layer of barrier material and a non-transparent heat plastified layer of virgin and regrind thermo plastic material to form a stratafied sheet having a relatively sharply defined juncture plane between its barrier strata and its virgin and regrind strata and having a total thickness of from about 0.010" to about 0.150", with the barrier layer thickness being from about 0.002" to about 0.025";
    (b) slitting a portion of the sheet as a sample, physically measuring the thickness of the sample's barrier strata by manual means, thereafter exposing said sample barrier strata to the transverse scan of a means for recording the yellowness of light reflected from said strata, and using these yellowness readings to determine a range of readings directly proportional to the corresponding physically measured sample barrier layer thicknesses, extrapolated to represent thicknesses within a range of from about 0.002" to about 0.025";
    (c) and thereafter continuing to produce the coextruded sheet, while transversely scanning its barrier layer strata with said means for recording the yellowness of light reflected from said sheet; and
    (d) programming said means for recording yellowness to transmit a signal sounding an alarm when said recorded yellowness at any point falls outside the predetermined range.

2. The method of claim 1 wherein the barrier material is selected from the group consisting of copolymers containing vinylidene chloride in an amount of from about 40% to about 98% by weight of the copolymer and at least one monoethylenically unsaturated monomer copolymerizable therewith in an amount of from about 60% to about 2% by weight of the copolymer and blends thereof.

3. The method of claim 1 wherein the barrier layer is a surface layer of the multilaminate.

4. The method of claim 1 wherein the barrier layer lies between a layer of optically transparent resinous material and the non-transparent material.

5. The method of claim 1 wherein the coextrusion is conducted at temperatures below the degradation temperature of the barrier material.

6. The method of claim 1 wherein the barrier layer is selected from the group consisting of ethylene vinyl alcohol, and ethylene vinyl alcohol blends.

7. The method of claim 1 wherein the barrier layer is selected from the group consisting of polyacrylonitrile, and polyacrylonitrile blends.

8. The method of claim 1 wherein the barrier layer is selected from the group consisting of nylon and nylon blends.

* * * * *

UNITED STATES PATENT AND TRADEMARK OFFICE
CERTIFICATE OF CORRECTION

PATENT NO. : 4,676,936

DATED : June 30, 1987

INVENTOR(S) : Theodore C. Wallace and Janet M. Streif

It is certified that error appears in the above-identified patent and that said Letters Patent is hereby corrected as shown below:

Column 1, line 11, "thickness" should read --thicknesses--.

Column 1, line 25, "3,773,40;" should read --3,773,420;--.

Column 2, line 61, "around 0.2;" should read --around .02;--.

Column 3, line 37, "components of" should read --components or--.

Signed and Sealed this

Twenty-fourth Day of May, 1988

Attest:

DONALD J. QUIGG

Attesting Officer

Commissioner of Patents and Trademarks